United States Patent [19]
Mott

[11] Patent Number: 5,454,605
[45] Date of Patent: Oct. 3, 1995

[54] TOOL JOINT CONNECTION WITH INTERLOCKING WEDGE THREADS

[75] Inventor: Keith C. Mott, Houston, Tex.

[73] Assignee: Hydril Company, Houston, Tex.

[21] Appl. No.: 78,995

[22] Filed: Jun. 15, 1993

[51] Int. Cl.⁶ .................................................. F16L 15/00
[52] U.S. Cl. .......................... 285/333; 285/334; 285/390
[58] Field of Search .................................. 285/390, 333, 285/334

[56] References Cited

U.S. PATENT DOCUMENTS

| | | | |
|---|---|---|---|
| Re. 34,467 | 12/1993 | Reeves | 285/334 |
| 3,224,799 | 12/1965 | Blose et al. | 285/334 |
| 3,989,284 | 11/1976 | Blose | 285/334 |
| 4,161,332 | 7/1979 | Blose | 285/334 |
| 4,192,533 | 3/1980 | Blose | 285/334 |
| 4,671,544 | 6/1987 | Ortloff | 285/334 |
| 4,703,954 | 11/1987 | Ortloff et al. | 285/334 |
| 4,703,959 | 11/1987 | Reeves et al. | 285/334 |
| 4,712,815 | 12/1987 | Reeves | 285/334 |
| 4,822,081 | 4/1989 | Blose | 285/334 |

FOREIGN PATENT DOCUMENTS 9318329  9/1993  WIPO .................................... 285/334

*Primary Examiner*—Eric K. Nicholson
*Attorney, Agent, or Firm*—Vaden, Eickenroht, Thompson & Feather

[57] ABSTRACT

A tubular connection is shown having wedge threads, the individual threads preferably interlocking by having wider crest dimensions than respective root dimensions, but with the stab flanks and load flanks generally angling in the same direction with respect to the longitudinal axis of the connection. Thus, when the stab flank is positive, it is less positive than the load flank is negative. Conversely, when the stab flank is negative, it is more negative than the load flank is positive. Preferably, the roots and crests radially interfere prior to full makeup. The connection achieves distribution over the entire thread length of the bearing stresses that resist torsional makeup, of the torque load, and of sealing. The slant of the flanks achieves self-centering of the pin member with respect to the box member either during assembly or disassembly depending on the angling in the respective embodiments.

17 Claims, 1 Drawing Sheet

FIG. 1
FIG. 3
FIG. 2
FIG. 4
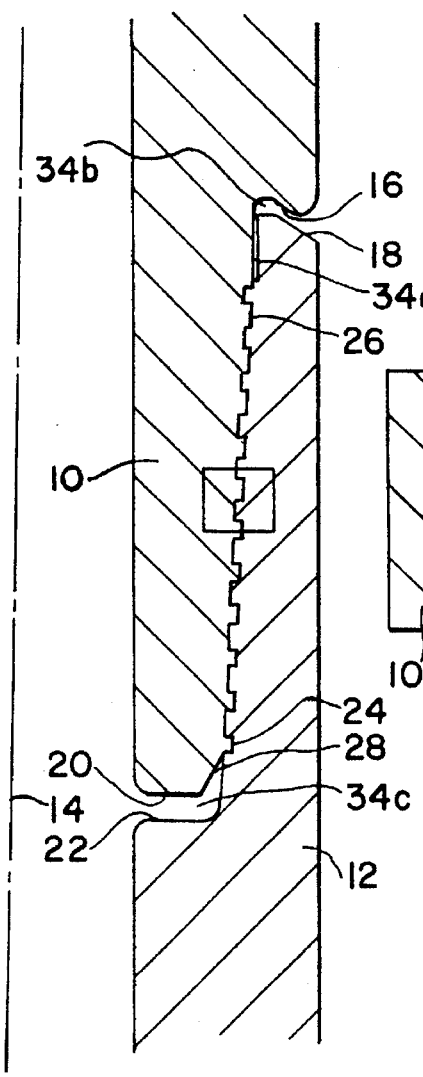
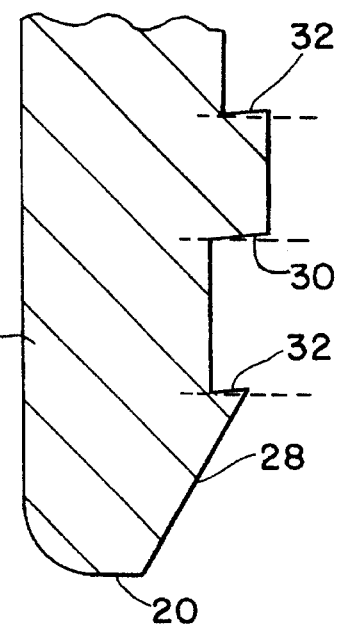
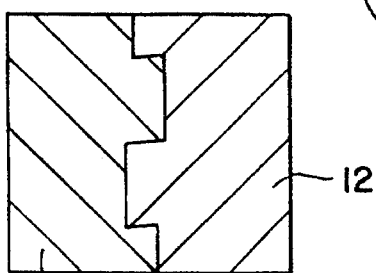
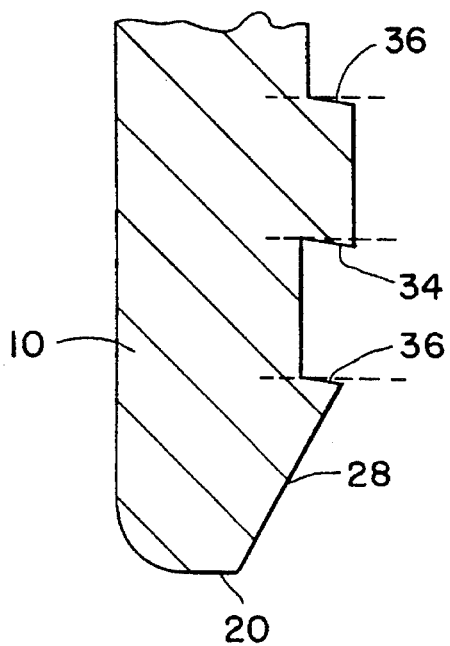

TOOL JOINT CONNECTION WITH INTERLOCKING WEDGE THREADS

BACKGROUND OF THE INVENTION

1. Field of the Invention

This invention relates to threaded tubular connections and more particularly to such connections employed in joining lengths of pipe or joints used for drilling oil and gas wells.

2. Background Description

Frequently, oil field tubular goods must be assembled and used under extremely adverse conditions. This is particularly true of tool joints used to join drill pipe, because in the normal course of drilling a well, the lengths of pipe or joints that comprise the drill string are assembled as the well is being drilled and are subjected to the many loads and vibrations of the drilling operations, disassembled as the drill string is temporarily withdrawn to change tools at the bottom of the drill string or while the partially drilled well is tested or for other purposes, and reassembled as the drill string is put back in operation.

Tool joints must be properly tightened to prescribed levels to achieve optimum performance and to resist additional rotational makeup while in service in the well. High operating torques applied to the drill string require even higher makeup torques during the assembly of the tool joints. Prior art tool joints utilize large shoulders adjacent to the threads to resist the loads caused by high makeup torques and to form pressure seals. The large shoulders require the outside diameter of the tool joint to be large.

Tapered wedge threads, are described in Reeves Reissue U.S. Pat. No. Re. 34,467, commonly assigned with the current application, are known to be an unusually strong connection that controls the stress and strain in the connected pin and box members to be within acceptable levels and is therefore employed in many heavy duty applications. However, the threads are generally dovetailed -(hyphen) shaped with load flanks and stab flanks that deverge outwardly to create crests of substantially wider dimensions than the contiguous roots. Such a-configuration creates an interlocking thread form. These wedge-type threads do not rely on shoulders to resist loads caused by torsional makeup. The conformation of the threads and adjoining shoulders have been used together in the prior art tool joints so that the bearing stresses that resist torsional makeup, the torque load and the sealing surfaces are shared between the threads themselves and the adjoining non-thread surfaces.

Dove-tailed threads such as Reeves that are symmetrical have a problem inasmuch as the slope of the stab flanks of a dovetailed thread pattern on a pin member present sharp edges to the similarly shaped sharp edges of the threads in the receiving box member as the two members are brought together to form a connection in the assembly process. Thus, unless the joints are perfectly axially aligned, the edges bang together, subjecting the edges to possible damage and preventing the pin from penetrating the box to the maximum extent. Likewise, upon disassembly, the sharp edges of the negative load flanks of the pin member and box member tend to hang onto one another as the joints are pulled apart, unless, again, the drilling rig that is employed to hold and manipulate a joint of the connection, usually the one with the pin member, can maintain perfect axial alignment of the pin member to the box member. The lack of perfect axial alignment can cause appreciable thread contact that can be injurious to the threads during stabbing or withdrawal, as the case may be.

There is mention in the resissue U.S. Pat. No. RE 34,467 that the threads discussed therein can also be semi-dovetailed in that one of the flank angles can be 90° to the axis of the connection. It is also mentioned in U.S. Pat. Nos. 4,600,224 and 4,600,225, Blose, that a flank can be chevron-shaped or include a V notch. In the '224 patent the portion of the chevron load flanks nearest the thread root on the pin member are dovetailed with respect to the stab flanks and in the '225 patent the portion of the chevron load flanks nearest the thread root on the pin member are parallel with the stab flanks. Neither of these patents show threads similar to those disclosed herein. Moreover, none of the wedge threads employed in the prior art have all of the characteristics or advantages of the wedge threads herein disclosed and discussed.

Therefore, it is a feature of the present invention to provide an improved threaded tubular connection, especially for a drill pipe, using wedge threads, but wherein the flanks of the threads are slanted to minimize thread damage either during makeup or removal.

It is another feature of the present invention to provide an improved threaded connection, especially for a drill pipe, using wedge threads with novel interlocking generally dovetailed-shaped threads, wherein the threads totally engage to distribute all of the bearing stresses resisting torsional makeup, the torque load and sealing over the entire thread length.

SUMMARY OF THE INVENTION

The threaded tubular connection disclosed herein applies to a tapered thread having one or more thread sets of wedge threads. A thread set on the pin member has a "wedge thread" when the stab (forward) and load (rearward) flanks of its wedge thread move apart as the thread winds around in a helix starting from the end of the thread closest to the nose of the pin member and, comparably, a thread set on the box member has a "wedge thread" when the stab and load flanks of its wedge thread move apart as the thread winds around in a helix starting from the end of the thread closest to the entry of the box member. Thus, as the connection is rotationally made up to the point where both flanks of a thread contact contiguous flanks of a thread grove, rotation ceases.

In a preferred embodiment of the invention, the stab flanks of the threads are positive and the load flanks of the threads are negative, with the stab flanks being at a greater angle to the axis of the connection, or more nearly radial, than the load flanks. These threads are interlocking and generally dovetailed-shaped because the longitudinal cross-section of the crests are wider than the corresponding thread roots. Also in the preferred embodiment, the radial dimensioning of the pin thread relative to the box thread is such that there is some interference before complete makeup or wedging of the threads to provide locked-in contact bearing stress around the entire thread form and over the entire length of the threads. No sealing is provided by a shoulder adjacent the threads. Thus, not only the bearing stress, but also the sealing and torque loading are distributed within the threads over the entire length of threads and are not provided or shared by any other structure related or associated with the threads. The pilot cone on the pin member is preferably angled at a steep angle away from the initial thread, since it is not required for sealing or any other purpose, to thereby assist in centering the pin member in the box member without subjecting any thread to possible damage, while also maximizing penetration of the pin into the box prior to rotational assembly. The positive stab flanks on the threads assist in accomplishing this centering penetration, as well. It is desirable that at least half of the threads are in engagement prior to rotational assembly.

An alternate embodiment preferred in some applications is similar to the above embodiment in all respects except that the flanks are both angled in the same direction, i.e., the stab flanks are negative and the load flanks are positive. The angling on the flanks is such that the load flanks are more nearly radial to the axis of the connection than are the stab flanks to provide a crest that is wider than the root dimensioning to maintain the generally dovetailed-shape for each thread. This means that the threads are interlocking and function during makeup in the same manner as the previously described embodiment, except that the stab flanks of the threads do not assist in centering the pin member during makeup or protecting the sharp corners of the thread adjacent the stab flanks. However, the slant of the load flanks does protect the threads as the pin member is withdrawn from the box member and provides self-centering of the pin member during this disassembly procedure.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiments thereof which are illustrated in the appended drawings, which drawings form a part of this specification. It is to be noted, however, that the appended drawings illustrate only preferred embodiments of the invention and are therefore not to be considered limiting of its scope as the invention may admit to other equally effective embodiments.

FIG. 1 is a partial cross-sectional view of a pin member engaging a box member in accordance with a preferred embodiment of the tubular connection invention disclosed herein.

FIG. 2 is an enlarged cross-sectional view of the thread structure of the tubular connection shown in FIG.1.

FIG. 3 is an enlarged cross-sectional view of a partial thread set on the pin member of a first preferred embodiment of the invention, exaggerating the thread structure.

FIG. 4 is an enlarged cross-sectional view of a partial thread set on the pin member of a second preferred embodiment of the invention, exaggerating the thread structure.

DESCRIPTION OF THE PREFERRED EMBODIMENTS

Now referring to the drawings, and first to FIG. 1, a pin member 10 of a preferred embodiment of the invention is shown fully made up with an accommodating box member 12. Only one side of the connection is shown, the longitudinal center axis of the connection 14 being shown at the left of figure. It will be seen that the threads are at a slight taper. Shoulder 16 of pin member 10 is not in contact with entry surface 18 of the box member and nose 20 of pin member 10 does not come to rest against shoulder 22 of box member 12, even though the threads are fully made up in the figure.

It will be seen that the threads are wedge threads in that first thread 24, the thread on pin member 10 nearest nose 20, has the smallest cross-sectional width of the threads on the pin member and final full thread 26 has the largest cross-sectional width of the threads on the pin member, with the other thread widths being graduated in size therebetween. In actuality, the thread set including threads 24 and 26 is a helix that gradually increases in thread-width dimension as the helix winds around the pin member starting with thread 24 and ending with thread 26.

The corresponding thread groove dimension in the box member decreases in the same direction or the intervening teeth in the box member gradually increase in size as the helical thread form winds from the entry end of the box member toward its deepest dimension. Since the connection shown in FIG. 1 illustrates complete engagement, the sides or flanks of the teeth are shown in adjacent contact with the corresponding thread groove sides or flanks, the teeth completely filling the groove along the entire length of the teeth.

The pin member includes a cone 28 between nose 20 and first tooth 24, which is a slanted or tapered surface at an appreciably steep angle with respect to axis 14. Thus, it will be seen that when the pin member is lowered into the box member during assembly of the connection, the tapered surface of cone 28 is normally well out of contact with the teeth of the box member. Should pin member 10 be so out of center alignment during assembly so as to bring cone 28 against the teeth of the box member, the cone slides off the box member teeth toward center alignment. Preferable, the angle of the cone should be between 15° and 45° with respect to the longitudinal axis of the connection.

As shown in FIG. 2, and as will be explained more fully in conjunction with the description of FIG. 3, both the stab flanks and the load flanks of the threads are swept back at angles from the center line when viewed from the nose of the pin member. This means that a stab flank, or the forward flank of a pin member thread, is "positive", which is defined as angling away from the adjacent thread groove. The load flank of a thread on the pin member, although generally angled with respect to axis 14 in the same direction as its stab flank, is "negative", which is defined as angling over the adjacent thread groove.

Thus, as shown in FIG. 3, which illustrates in an exaggerated view the first portion of the thread set on pin member 10, there is a stab flank 30 nearest nose 20 and a load flank 32 there-opposite. Radial lines are drawn to show that stab flank 30 extends at a smaller angle from the radial plane than that of load flank 32. This establishes the cross-sectional width of the thread crest to be wider than the width of the thread root. Thus, the thread achieves an interlocking engagement with the accommodating groove in the box member when the connection is assembled.

Returning to FIG. 1, it will be seen that there is a gap 34a shown between the cylindrical surfaces adjacent the last thread of pin member 10 and the first thread of box member 12, as well as gap 34b between shoulder 16 of the pin and entry surface 18 of the box and gap 34c between nose 20 of the pin and shoulder 22 of the box. Thus, in the connection illustrated, there is no contact of any surface in the connection when there is complete assembly of the connection except within the threads themselves. It will also be seen that the crests, roots and flanks of the threads are in full engagement when the connection is fully made up. Actually, the crests and roots radially come in contact with one another just prior to full makeup so that as the connection is torque tightened to its use condition, the bearing surfaces that stress the connection and resist the torsional load, are the various thread crests, roots and flanks of the threads. The threads, and specifically the relationship between root and crest interference and flank engagement, are so designed that these bearing stresses are evenly distributed throughout the length of the thread of the connection. Because of helical wedging of the threads and the balance of radial force components from the stab and load flanks, hoop stresses are controlled in both the pin member and the box member. Moreover, since there is no radial clearance between the thread crests of one member and the roots of its mating member, or any other clearance within the threads themselves when the connection is fully made up, there is no entrapped lubricant between the crests and roots as with some prior art wedge-type threads.

It is noted that as a result of this even distribution and the fact that no portion of the stresses are also carried by nearby shoulders, the outside diameter of the connection can be made smaller to carry the same bearing stress load as prior art connections that at least partly rely on carrying the same bearing stress load on one or more shoulders.

It may also be seen that the structure just described provides full sealing against pressures by distributing such sealing along the full length of the threads. Likewise, full torque loading of the connection while in use is fully in the threads and distributed along the entire thread length.

Referring again to FIG. 3, one partial thread and one full thread on pin member 10 is shown, selected to be the most forward threads or the ones closest to nose 20. The threads are shown in exaggerated dimension with respect to cone 28, but illustrate that the angling of the surface on stab flank 30 is generally swept back and away from nose 20. This slope of the stab flank has previously been described as "positive". Because of the angling, threads with positive stab flanks help self-center the advancing pin member in the box member without unnecessarily hitting the edges of the threads in the box member with any more force than a glancing blow. Thus, there is little chance that the threads on the pin member or the box member will be damaged during makeup. This provides that several of the threads on the pin member and box member will be in engagement alignment prior to rotational assembly. Desirably, at least half of the threads are so engaged. The cone also assists in self-centering the pin member with the box member during this initial part of the assembly prior to rotation. Load flank 32 is at a greater angle to the longitudinal axis of the connection than stab flank 30. This gives the thread a generally dovetailed shape and crests that are wider than the roots so that the threads on the pin and box will interlock when the connection is made up.

FIG. 4 illustrates in comparable fashion to the thread shown in FIG. 3, a thread from an alternate preferred embodiment of the invention. In this embodiment, the threads of the pin member have negative stab flanks 34 and positive load flanks 36. To provide generally dovetailed-shaped interlocking threads, the angle of the negative stab flanks with respect to the radial plane is smaller than the comparable angle of the positive load flank with respect to the radial plane. Or, in other words, the angle of the positive stab flanks is greater with respect to the axis of the connection than is the angle of the positive load flank. In all events, the width of the crests in longitudinal cross section is greater than the widths of the respective roots. Because this forms an interlocking tooth form, as with the tooth form shown in FIG. 3, the connection as it is being made up and after it has been made up has the same characteristics as the previously described embodiment, except with respect to self-centering caused by contact of the stab flanks during assembly.

Instead, the structure shown in FIG. 4 has a similar self-centering characteristic as the pin member is disassembled from the accommodating box member. This is because as the pin member is withdrawn from the box member, the thread surfaces of the positive load flanks come into contact with the crests of the threads of the box member so as to only bump them in a non-injurious glancing blow.

While particular embodiments of the invention have been shown and described, with variations suggested, it will be understood that the invention is not limited thereto, since many modifications may be made and will become apparent to those skilled in the art. For example, the pin member and box member are not necessarily limited to only one thread set as shown in FIG. 1, but may include a second pin thread set at a different radial location, as well, as is employed in many premium oil field tubular products. Moreover, the connection is not necessarily only limited to drill pipe connections, but can be employed in casing, tubing and other tubular connections, as well. Finally, although the bearing stresses, torque load, and sealing are accommodated by distribution over the entire thread length in the preferred embodiments, it will be understood that so long as these accommodations are substantially within the thread length, such structures are within the scope of this invention.

What is claimed is:

1. A threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a pipe connection, a pipe thread lubricant coating the threads, said threads increasing in width in one direction on the box and in the other direction on the pin so the roots, crests, and flanks of the threads move together and form seals that resist the flow of fluids between the threads with the roots and crests being designed to move into engagement before both the load flanks and the stab flanks move into engagement to complete the sealing of the connection as the connection is fully made up, said load flanks having a negative taper and the stab flanks having a positive taper that is less than the negative taper of the load flank to lock the pin and box together when the connection is fully made up and to provide outwardly and upwardly inclined stab flanks that will center the pin in the box relative to the threads in the box as the pin is being stabbed into the box.

2. The connection of claim 1 in which the taper of the stab flanks is inclined upwardly about 5° and the load flanks are inclined upwardly about 10°.

3. A threaded pipe connection comprising a box having tapered, internal, generally dovetail-shaped threads and a pin having tapered, external, generally dovetail-shaped threads that mate with the threads on the box when the connection is made up, a pipe thread lubricant coating the threads, said threads on the box and pin having stab flanks that are in engagement as the pin moves into the box due to relative rotation of the pin and box, roots and crests that move into engagement during rotational make-up and load flanks that move into engagement upon rotational make-up of the threaded connection, said load flanks having a negative taper and the stab flanks having a positive taper that is less than the negative taper of the load flanks but sufficient to guide the pin into the box and to lock the pin and box together when the connection is fully made up.

4. In a threaded pipe connection including a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a threaded pipe connection, said threads increasing in width in one direction on the box and in the other direction on the pin, the stab flanks and the roots and crests being designed to move into engagement when the pin and box are made up hand-tight during rotational makeup of the connection after which continued makeup of the connection moves the load flanks into engagement upon rotational makeup of the connection, the improvement comprising stab flanks that have a positive taper so the stab flanks will urge the pin toward the center of the box when stabbing the pin into the box and load flanks that have a negative taper greater than the positive taper of the stab flanks to provide a thread having crests wider than its roots to interlock with the threads on the box when the connection is made up.

5. The connection of claim 4 in which the taper of the stab flanks is about 5° and the taper of the load flanks is about 10°.

6. In a threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a pipe joint, a pipe thread lubricant coating the threads, said threads increasing in width in one direction on the box and in the other direction on the pin so the roots, crests, and flanks of the threads move together and form seals that resist the flow of fluids between the threads with the roots and crests being designed to move into engagement before both the load flanks and the stab flanks move into engagement to complete the sealing of the connection as the connection is fully made up, the improvement comprising stab flanks having a positive taper so the stab flanks will urge the pin toward the center of the box when stabbing the pin into the box and load flanks that have a negative taper greater than the positive taper of the stab flanks to provide a thread having crests wider tan its roots to interlock with the threads on the box when the connection is made up.

7. The connection of claim 6 in which the taper of the stab flanks is about 5° and the taper of the load flanks is about 10°.

8. A threaded pipe connection comprising a box having tapered, internal, generally dovetail-shaped threads with stab flanks and load flanks, and flat roots and crests that are parallel to the longitudinal axis of the pipe, and a pin having tapered, external, generally dovetail-shaped threads with stab flanks and load flanks, and flat roots and crests that are parallel to the longitudinal axis of the pipe, for mating with the internal threads of the box to make up a threaded pipe connection, said threads increasing in width in one direction on the box and in the other direction on the pin so that the roots and crests move into engagement during rotational makeup and the flanks of the threads move together in that order until the connection is fully made up, said roots and crests having sufficient width to prevent any permanent deformation of the threads and the stab flanks having a positive taper to guide the pin into the box and the load flanks having a negative taper greater than the positive taper of the stab flanks to provide crests wider than the roots to lock the thread together when made up.

9. In a threaded pipe connection including a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a threaded pipe connection, said threads increasing in width in one direction on the box and in the other direction on the pin, and with at least the threads on one of the box and pin being coated with thread lubricant prior to make up, the stab flanks and the roots and crests being designed to move into engagement when the pin and box are made up hand-tight during rotational make-up of the connection after which continued make up of the connection moves the load flanks into engagement upon rotational make-up of the connection, said stab flanks having a positive taper to guide the pin into the box and the load flanks having a negative taper greater than the positive taper of the stab flanks to provide crests wider than the roots to lock the threads together when made up.

10. A threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a pipe joint, a pipe thread lubricant coating the threads, said threads increasing in width in one direction on the box and in the other direction on the pin so the roots, crests, and flanks of the threads move together and form seals that resist the flow of fluids between the threads with the roots and crests being designed to move into engagement before both the load flanks and the stab flanks move into engagement to complete the sealing of the connection as the connection is fully made up, said load flanks having a negative taper and the stab flanks having a positive taper that is less than the negative taper of the load flanks to lock the pin and box together when the connection is fully made up.

11. A threaded pipe connection comprising a box having tapered, internal, generally dovetail-shaped threads and a pin having tapered, external, generally dovetail-shaped threads that mate with the threads on the box when the connection is made up, a pipe thread lubricant coating the threads, said threads on the box and pin having stab flanks that are in engagement initially as the pin moves into the box and roots and crests that move into engagement after the stab flanks but before the load flanks move into engagement when the connection is fully made up, said load flanks having a negative taper and the stab flanks having a positive taper that is less than the negative taper of the load flanks to guide the pin into the box and to lock the pin and box together when the connection is fully made up.

12. In a threaded pipe connection including a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a threaded pipe connection, said threads increasing in width in one direction on the box and in the other direction on the pin, and with at least the threads on one of the box and pin being coated with thread lubricant prior to make up, the roots and crests being designed to move into engagement before both the stab flanks and the load flanks move into engagement as the connection is fully made up, the improvement comprising said load flanks having a negative taper and the stab flanks having a positive taper that is less than the negative taper of the load flanks to guide the pin into the box and to lock the pin and box together when the connection is fully made up.

13. In a threaded pipe connection comprising a box having tapered, internal, generally dovetail-shaped thread with stab flanks and load flanks and flat roots and crest that are parallel to the longitudinal axis of the pipe an a pin having tapered, external, generally dovetail-shape threads with stab flanks and load flanks and flat roots and crests that are parallel to the longitudinal axis of the pipe for mating with the internal threads of the box to make up a threaded pipe connection, a pipe thread lubricant coating the threads, said threads increasing in width in one direction on the box and in the other direction on the pin, the stab flanks and load flanks, but not both, being in engagement at any one time before the roots and crests move into engagement during rotational make-up of the connection after which the other flanks move into engagement upon rotational make-up of the connection, the improvement comprising said load flanks having a negative taper and the stab flanks having a positive taper that is less than the negative taper of the load flanks to guide the pin into the box and to lock the pin and box together when the connection is fully made up.

14. A threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a pipe connection, a pipe thread lubricant coating the threads, said threads increasing in width in one direction on the box and in the other direction on the pin so the roots, crests, and flanks of the threads move together and form seals that resist the flow of fluids between the threads with the roots and crests being designed to move into engagement during rotational make-up before both the load flanks and the stab flanks move into engagement when the connection is fully made up, said load flanks having a negative taper and the stab flanks having a positive taper that is less than the negative taper of the load flanks that is sufficient to guide the pin into the box and to lock the pin and box. together when the connection is fully made up.

15. A threaded pipe connection comprising a box having tapered, internal, generally dovetail-shaped threads and a pin having tapered external, generally dovetail-shaped threads that mate with the threads on the box when the connection is made up, a pipe thread lubricant coating the threads, said dovetail-shaped threads on the box and pin providing stab flanks and load flanks only one set of which is in engagement at any given time as the pin moves into the box during rotational make-up of the pin and box, and roots and crests that move into engagement during rotational make-up before the other set of flanks move into engagement upon rotational make-up of the connection, said load flanks having a negative taper and the stab flanks having a positive taper that is less than the negative taper of the load flanks but sufficient to guide the pin into the box and to lock the pin and box together when the connection is fully made up.

16. A threaded pipe connection comprising a box having tapered, internal, generally dovetail-shaped threads with stab flanks and load flanks, and flat roots and crests that are parallel to the longitudinal axis of the pipe, and a pin having tapered, external, generally dovetail-shaped threads with stab flanks and load flanks, and flat roots and crests that are parallel to the longitudinal axis of the pipe, for mating with the internal threads of the box to make up a threaded pipe connection, a pipe thread lubricant coating the threads, said threads increasing in width in one direction on the box and in the other direction on the pin whereupon during rotational make up one or the other of the flanks, but not both may be in engagement at any given time prior to engagement of the roots and crests during rotational make-up, and the remaining unengaged flanks of the threads moving together after the engagement of the roots and crests upon rotational make-up of the connection, said load flanks having a negative taper and the stab flanks having a positive taper that is less than the negative taper of the load flanks but sufficient to guide the pin into the box and to lock the pin and box together when the connection is fully made up.

17. In a threaded pipe connection comprising a box having tapered, internal, generally dovetail-shaped threads with stab flanks and load flanks and flat roots and crests that are parallel to the longitudinal axis of the pipe and a pin having tapered, external, generally dovetail-shaped threads with stab flanks and load flanks and flat roots and crests that are parallel to the longitudinal axis of the pipe for mating with the internal threads of the box to make up a threaded pipe connection, a pipe thread lubricant coating the threads, said threads increasing in width in one direction on the box and in the other direction on the pin the improvement comprising having the roots, crests, and one of the flanks of the threads move together when the pin and box are made up hand-tight during rotational make-up of the connection after which continued rotational make-up of the connection moves the other flanks together upon rotational make-up of the connection thereby reducing substantially the volume of lubricant between the roots and crests when the connection is made up, said load flanks having a negative taper and the stab flanks having a positive taper that is less than the negative taper of the load flanks but sufficient to guide the pin into the box and to lock the pin and box together when the connection is fully made up.

\* \* \* \* \*